US006880429B1

(12) United States Patent
Daniel et al.

(10) Patent No.: US 6,880,429 B1
(45) Date of Patent: Apr. 19, 2005

(54) TRANSMISSION ASSEMBLY

(76) Inventors: Steven A. Daniel, 313 Oakbrook Dr., East Peoria, IL (US) 61611; Michael G. Cronin, 5739 W. Martindale La., Peoria, IL (US) 61615-9669

( * ) Notice: Subject to any disclaimer, the term of this patent is extended or adjusted under 35 U.S.C. 154(b) by 0 days.

(21) Appl. No.: 10/422,984

(22) Filed: Apr. 25, 2003

Related U.S. Application Data

(60) Provisional application No. 60/421,110, filed on Apr. 30, 2002.

(51) Int. Cl.[7] ............................................. F16H 47/00
(52) U.S. Cl. ..................... 74/730.1; 74/606 R; 475/72; 475/78; 475/83
(58) Field of Search ............. 74/730.1, 606 R; 475/72, 475/78, 83

(56) References Cited

U.S. PATENT DOCUMENTS

| 3,735,646 | A |   | 5/1973  | Roberts ........................ 74/687 |
| 4,315,442 | A | * | 2/1982  | Cordner ........................ 475/72 |
| 5,667,452 | A |   | 9/1997  | Coutant ........................ 475/81 |
| 5,791,205 | A | * | 8/1998  | Ruppert, Jr. .............. 74/606 R |
| 5,823,752 | A |   | 10/1998 | Hoenisch et al. ........... 417/363 |
| 5,890,981 | A | * | 4/1999  | Coutant et al. ................ 475/72 |
| 5,967,927 | A | * | 10/1999 | Imamura et al. ............... 475/83 |
| 6,358,173 | B1 | * | 3/2002 | Klemen et al. ................. 475/5 |
| 6,565,471 | B1 | * | 5/2003 | Weeramantry et al. ....... 475/80 |
| 6,709,357 | B1 | * | 3/2004 | Schleuder et al. .......... 475/223 |

FOREIGN PATENT DOCUMENTS

| EP | 450282 A2 | * 10/1991 |
| EP | 0 509 724 A1 | 10/1992 |
| EP | 1 028 019 A2 | 8/2000 |
| EP | 1 028 020 A2 | 8/2000 |

* cited by examiner

*Primary Examiner*—Rodney H. Bonck
*Assistant Examiner*—David D. Le
(74) *Attorney, Agent, or Firm*—Finnegan, Henderson, Farabow, Garrett & Dunner; Steve M Hanley

(57) ABSTRACT

A transmission assembly includes a housing, an input shaft driveably engaged with a drive source and being rotatably supported in the housing, and an output shaft rotatably supported in the housing. A hydrostatic transmission component is disposed within the housing and is drivingly engaged with the input shaft. A mechanical transmission component is disposed within the housing and is drivingly engaged with the input shaft. The hydrostatic transmission component and the mechanical transmission component are drivingly engaged with the output shaft. The hydrostatic transmission component is moveably mounted within the housing and is axially moveable relative to the input shaft.

29 Claims, 7 Drawing Sheets

TRANSMISSION ASSEMBLY

This application claims the benefit of U.S. provisional application No. 60/421,110 filed Apr. 30, 2002, which is incorporated by reference.

TECHNICAL FIELD

The invention relates generally to a transmission assembly and, more particularly, to a hybrid transmission assembly which includes an electric or a hydraulic drive component being connected with a mechanical component within the transmission assembly.

BACKGROUND

Hybrid transmissions are known and typically include a drive component, such as, an electric or hydraulic drive system, coupled with a mechanical component, such as, a gearing arrangement. A common electric drive system may be an electric motor and a common hydraulic drive system may be a hydrostatic pump and motor unit. Thus, a hydrostatic pump and motor unit is usually attached to an enclosure or transmission housing using an SAE standard mounting arrangement, such as a flange and pilot. The unit often includes a splined shaft that connects to an independently supported gear or shaft within the device. This standard mounting arrangement allows for accurately locating the unit. For example, in a typical wheeled vehicle, an input shaft which is connected to a hydrostatic component drives a driving device, such as a transaxle. EP 1 028 020 A2 shows one such device. In EP 1 028 020 A2, the hydrostatic component has an output shaft that is coupled to the remaining portion of the driving device. The input shaft and output shaft are substantially perpendicular to each other. The hydrostatic transmission is connected to the outside of the driving device using two flanges to locate the unit.

In recent years, a type of transmission, commonly referred to as a hybrid transmission, has developed where the electric or hydraulic drive system is located in a common housing with a mechanical transmission component. In one such arrangement, the input shafts and output shafts are oriented parallel to each other. This provides the advantage of reducing the overall dimensions of the transmission.

However, using an SAE standard mounting arrangement will not work as well where the electric or hydraulic drive system is located within the housing, as described above. For example, in an inline arrangement, there generally is not a suitable location to bolt the drive system to the common housing. In addition, the drive system is not readily accessible for bolting because it is located within the housing, thereby making it difficult to secure the drive system.

The present invention provides a mounting assembly and method that solves one or more to the problems set forth above.

SUMMARY OF THE INVENTION

One aspect of the present invention is directed to a transmission assembly. The transmission assembly includes a housing, an input shaft driveably engaged and being rotatably supported in the housing, and an output shaft rotatably supported in the housing. A drive unit is disposed within the housing and is operative to rotate the output shaft in response to an input. A mechanical transmission component is disposed within the housing and is drivingly engaged with the input shaft. The drive unit and the mechanical transmission component are drivingly engaged with the output shaft. The drive unit is moveably mounted within the housing and is axially moveable relative to the input shaft.

Another aspect of the present invention is directed to a transmission. The transmission includes a transmission housing having a first face that defines at least two guide holes, a drive unit located inside the transmission housing, a mechanical transmission component located inside the transmission housing, an input operative to activate the drive unit, the drive unit being engaged with the mechanical transmission component, an input shaft passing through the transmission housing, and an output shaft passing through the transmission housing. The input shaft may be coupled to the mechanical transmission component. The output shaft may be coupled to the mechanical transmission component. The drive unit has a first axial end with at least two flange portions and a second axial end. Each flange portion includes a guide hole configured to align with one of the at least two guide holes of the transmission housing. A support member connects each of the flange portions with one of the at least two guide holes in the first face of the transmission housing.

Still another aspect of the present invention is directed to a method of assembling a transmission assembly. The method includes providing a housing, supporting an input shaft in the housing, and supporting an output shaft in the housing. The method also includes mounting a drive unit within the housing. A mechanical transmission component is located within the housing and the input shaft is connected to the mechanical transmission component. The method further includes connecting the output shaft to the drive unit through the mechanical transmission component. The drive unit is axially moveable relative to the input shaft.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Reference will now be made in detail to the present exemplary embodiment of the invention, an example of which is illustrated in the accompanying drawings. Wherever possible, the same reference numbers will be used throughout the drawings to refer to the same or like parts.

Figure 1:
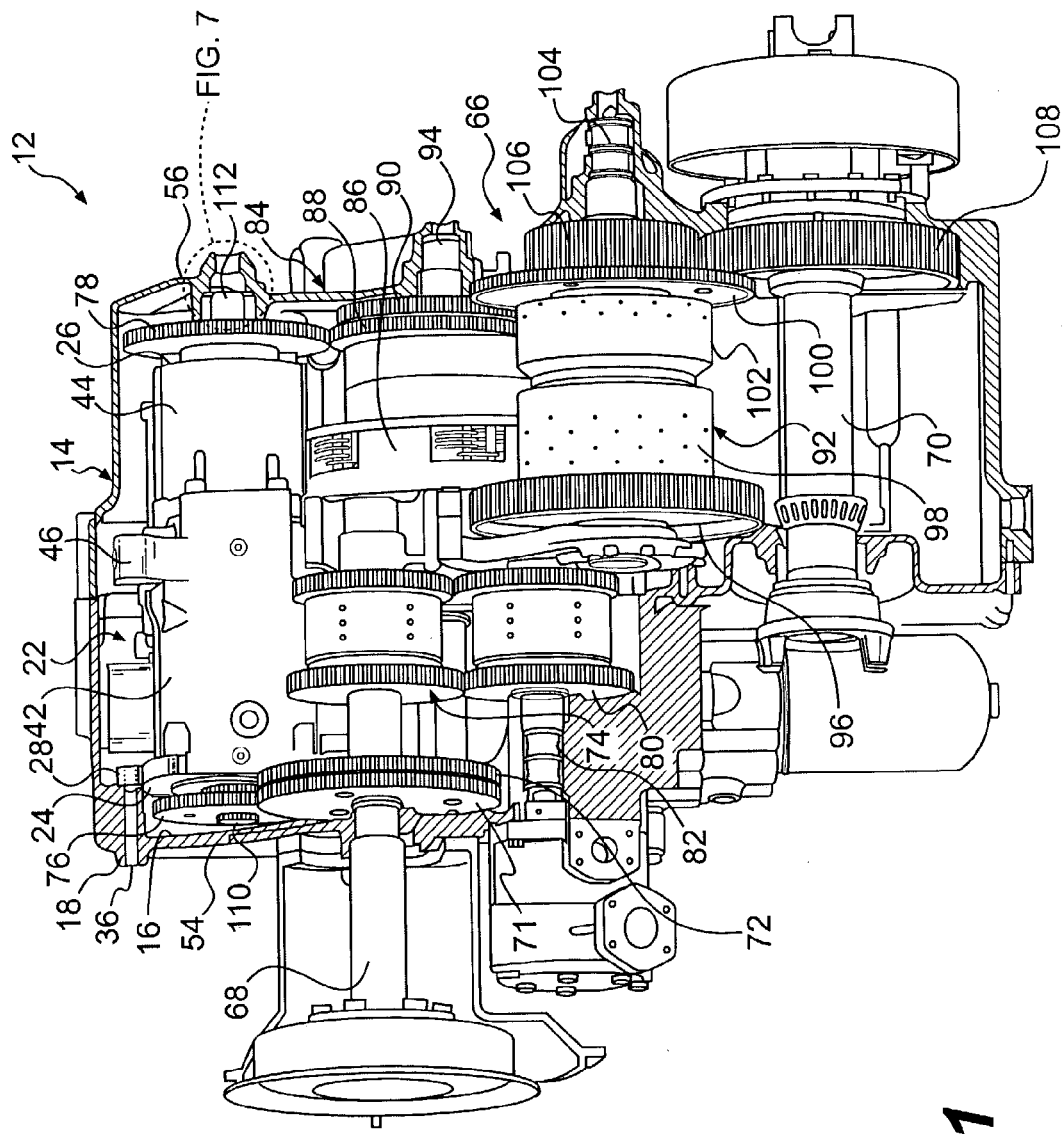
FIG. 1 is a cut-away perspective view of a transmission incorporating one embodiment of the present invention.

A method and mounting assembly is provided for locating a drive unit within a transmission housing. The drive unit may include, for example, an electric drive component or a hydraulic drive component such as a hydrostatic system. It is envisioned that alternative drive units known to those of ordinary skill in the art may also be used. As shown in FIG. 1, the overall transmission includes an input shaft, a drive unit, a mechanical transmission component, a transmission housing, and an output shaft. As shown, the drive unit is mounted internally to the transmission housing in accordance with one embodiment of the present invention.

In the exemplary embodiment shown in FIG. 1, the input shaft 68, which may be coupled to any suitable engine (not shown), passes through the transmission housing 14 of the transmission 12 and is rotatably supported in the transmission housing 14. The input shaft 68 is coupled to the drive unit 22 and the mechanical transmission component 66 located within the transmission housing 14. The mechanical transmission component 66 is coupled to the output shaft 70, which passes through the transmission housing 14 and is rotatably supported in the transmission housing 14.

A mounting assembly is provided to mount the drive unit 22 in the transmission 12. This allows the drive unit 22 to be movably mounted within the transmission housing 14 and to be axially moveable relative to the input shaft 68.

Referring to FIGS. 1–4, a mounting assembly 10 for a transmission 12 includes a transmission housing 14, or housing, with a first face 16, or mounting face, defining two guide holes 18 and 20, such as through holes or blind holes. The drive unit 22, which is located within the transmission housing 14, has a first axial end 24 and a second axial end 26. The first axial end 24 may have two flange portions 28 and 30 and each flange portion 28 and 30 includes guide holes 32 and 34, such as through holes, respectively, configured to align with the two guide holes 18 and 20 of the transmission housing 14.

The two flange portions 28 and 30 define a flange mounting face on the first axial end 24 of the drive unit 22 which may overlay the first face 16. The flange mounting face may be substantially perpendicular relative to the axial centerline of the input shaft 68. A pair of support members 36 and 38, such as dowels, may be used to connect each of the flange portions 28 and 30 with the guide holes 18 and 20 in the first face 16 of the transmission housing 14. The pair of support member 36 and 38 may be fixed to the transmission housing 14.

It is understood that there may be more than two flange portions and that each flange portion may include more than one guide hole. In addition, if more than two flange portions are provided, the flange portions do not need to be symmetrically placed so long as they are distributed in a manner to sufficiently absorb torque loads.

Each of the guide holes 18 and 20 in the first face 16 may provide a tight fit for the support members 36 and 38. This allows the support members to be securely attached to the transmission housing 14. If desired, the fit between the support members 36 and 38 and the guide holes 18 and 20 of the transmission housing 14 could be an interference fit, such as medium force fit, a heavy force fit, or a shrink fit. Alternatively, the guide holes 18 and 20 may be threaded and the support members 36 and 38 may be provided with corresponding threads on one end thereof to secure the support members 36 and 38 in the first face 16 of the transmission housing 14.

Figure 4:
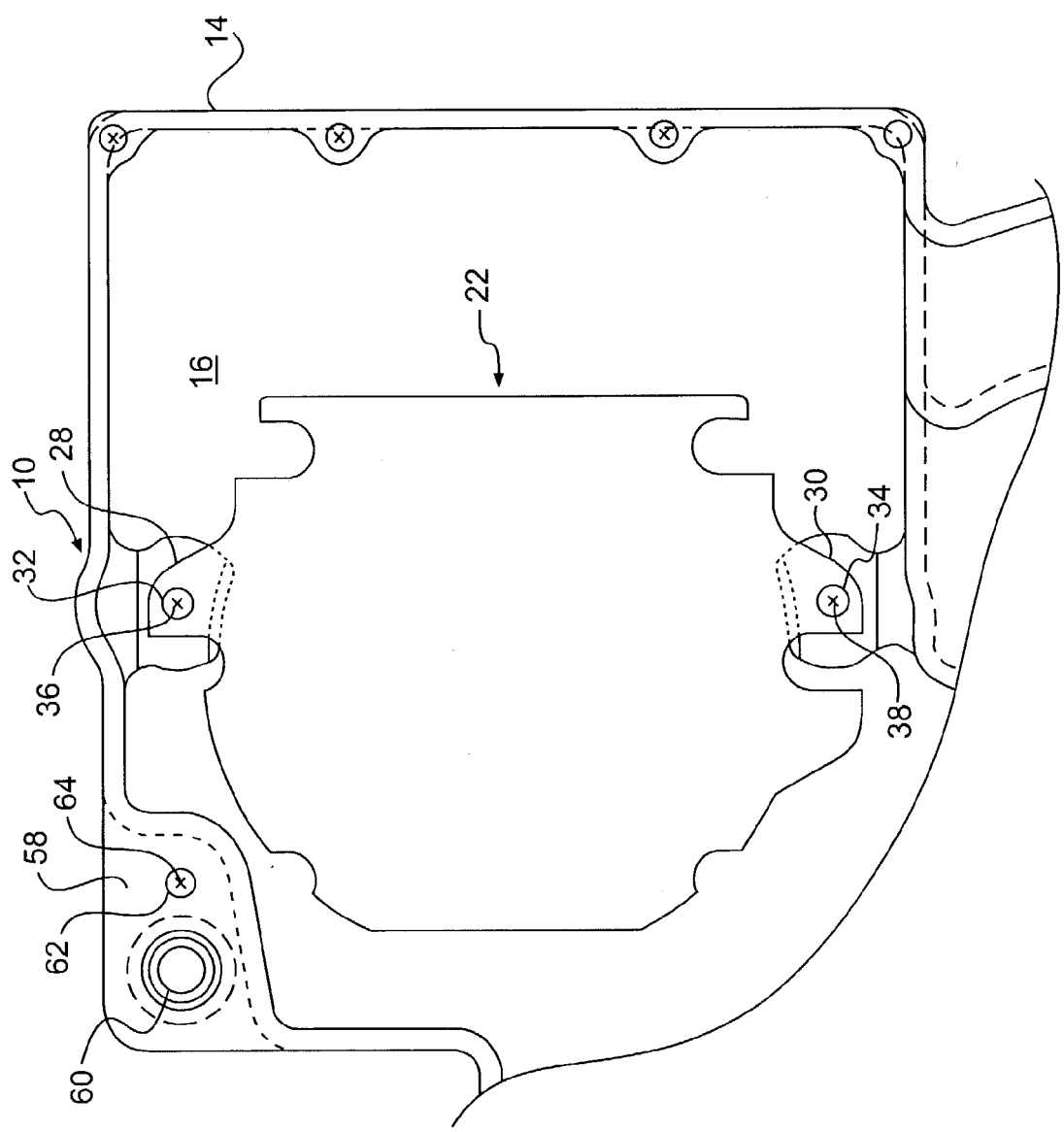
FIG. 4 is a partial side view of FIG. 1 showing the transmission housing and a footprint of the drive unit taken at the first axial end of the drive unit.

As seen in FIGS. 1 and 4, additional material may be provided around the guide holes 18 and 20. This may assist in supporting the support members 36 and 38, as well as enclosing a substantial portion of the support members 36 and 38 such that only an end of the support members 36 and 38 extend into the guide holes 32 and 34 of the drive unit 22. Alternatively, the support members may extend beyond the guide holes 32 and 34 of the drive unit 22.

Each guide hole 32 and 34 of the drive unit 22 may provide a slip fit, or loose fit, for the support members 36 and 38. A slip fit may allow for tolerancing, if necessary in mounting the drive unit 22 within the transmission housing 14. Alternatively, the fits of all of the guide holes may be switched so that the guide holes 18 and 20 of the transmission housing 14 have a slip fit, while the guide holes 32 and 34 of the drive unit 22 have a tight fit.

The spacing and dimensions of the guide holes 32 and 34 of the drive unit 22 can vary. In one exemplary arrangement, the center of the guide holes 32 and 34 may be separated by a distance of 244.22 mm and offset 22.66 mm from a center point of the drive unit. Alternatively, the center of the guide holes 32 and 34 may be separated by a distance of 236 mm and offset 21.82 mm from a center point of the drive unit. Different distances and offsets may be used depending on the size of the drive unit and all such variations come within the scope of the present invention.

Figure 2:
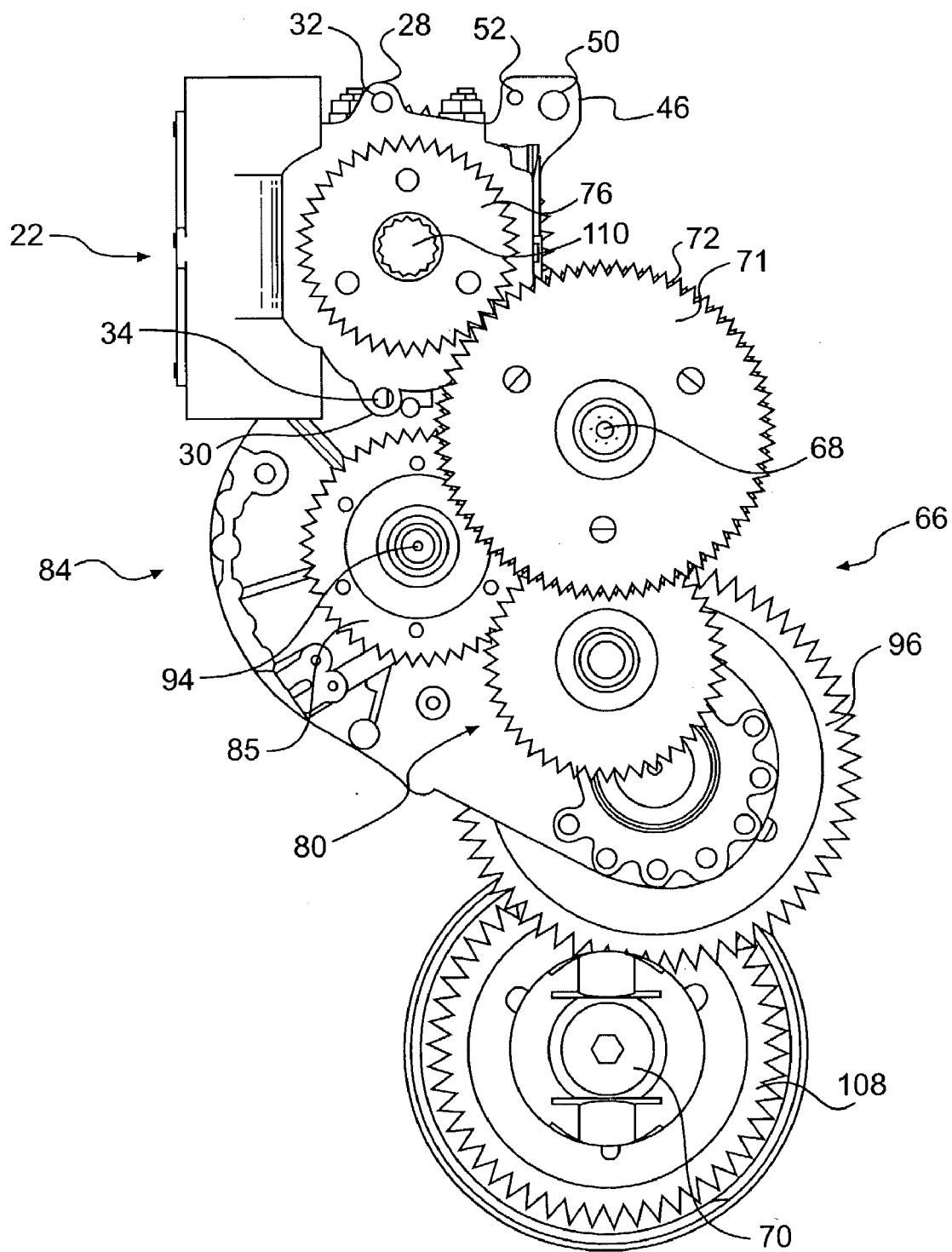
FIG. 2 is left side view of FIG. 1 with the transmission housing removed.
Figure 3:
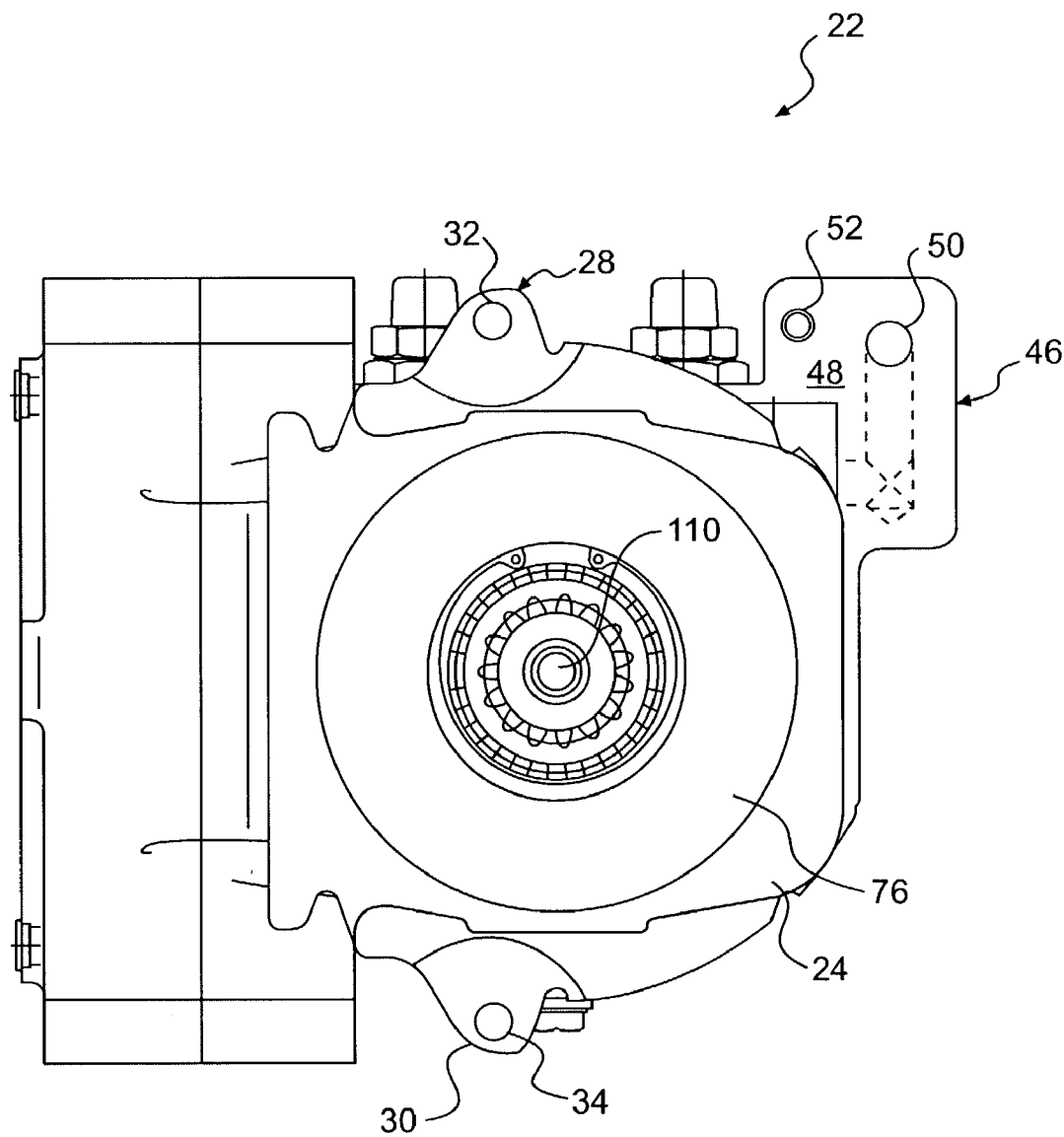
FIG. 3 is a close-up view of the drive unit of FIG. 2.

As seen in FIGS. 2–4, the two flange portions 28 and 30 of the drive unit 22 may be arranged substantially opposite each other. This arrangement of the two flange portions 28 and 30 assists in limiting the rotation of the drive unit 22 due to torque loading developed while the transmission 12 is in use.

Figure 5:
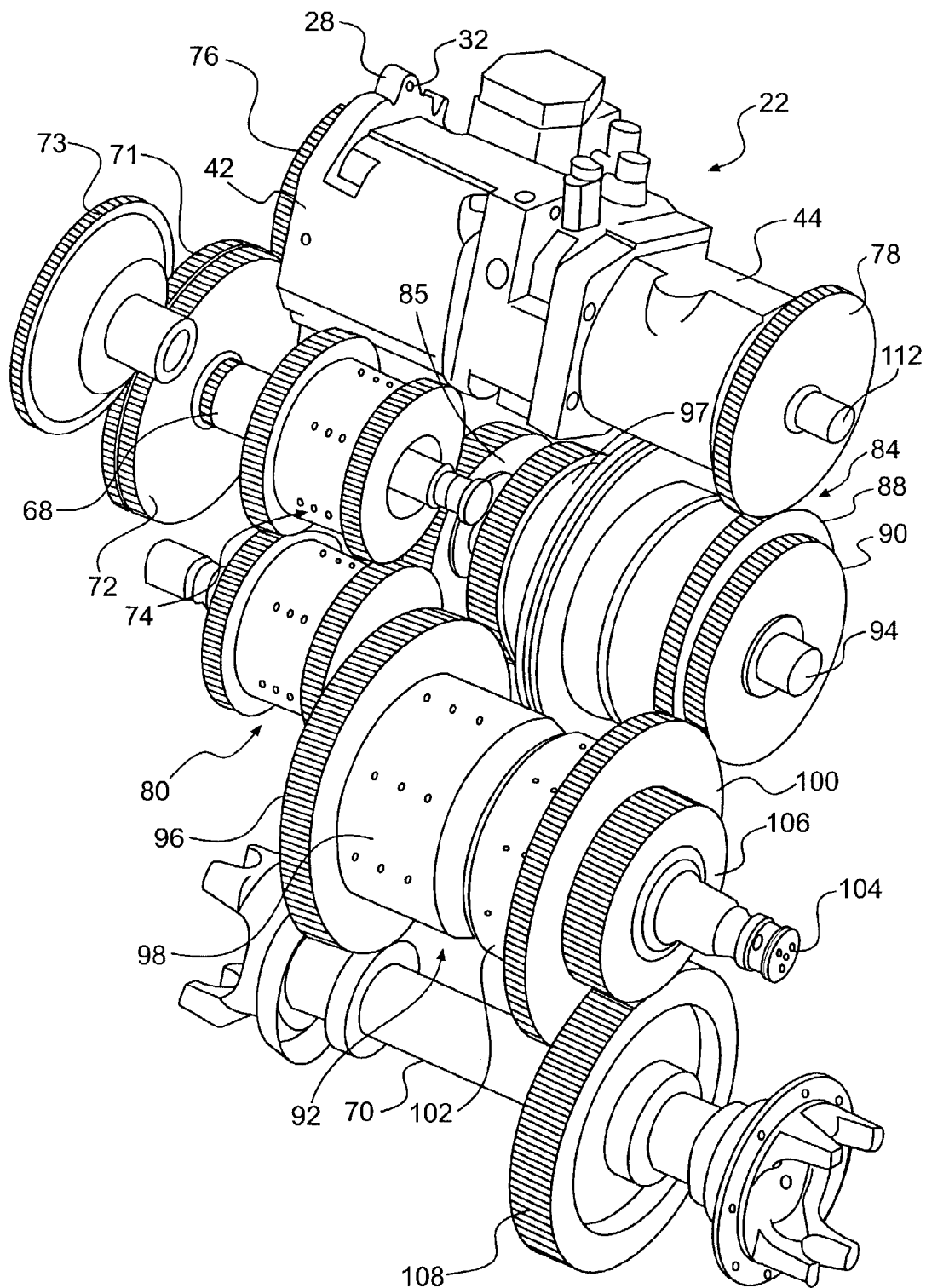
FIG. 5 is a simplified perspective view of the transmission of FIG. 1 with the transmission housing, gear teeth, and covering of the planetary system removed.
Figure 6:
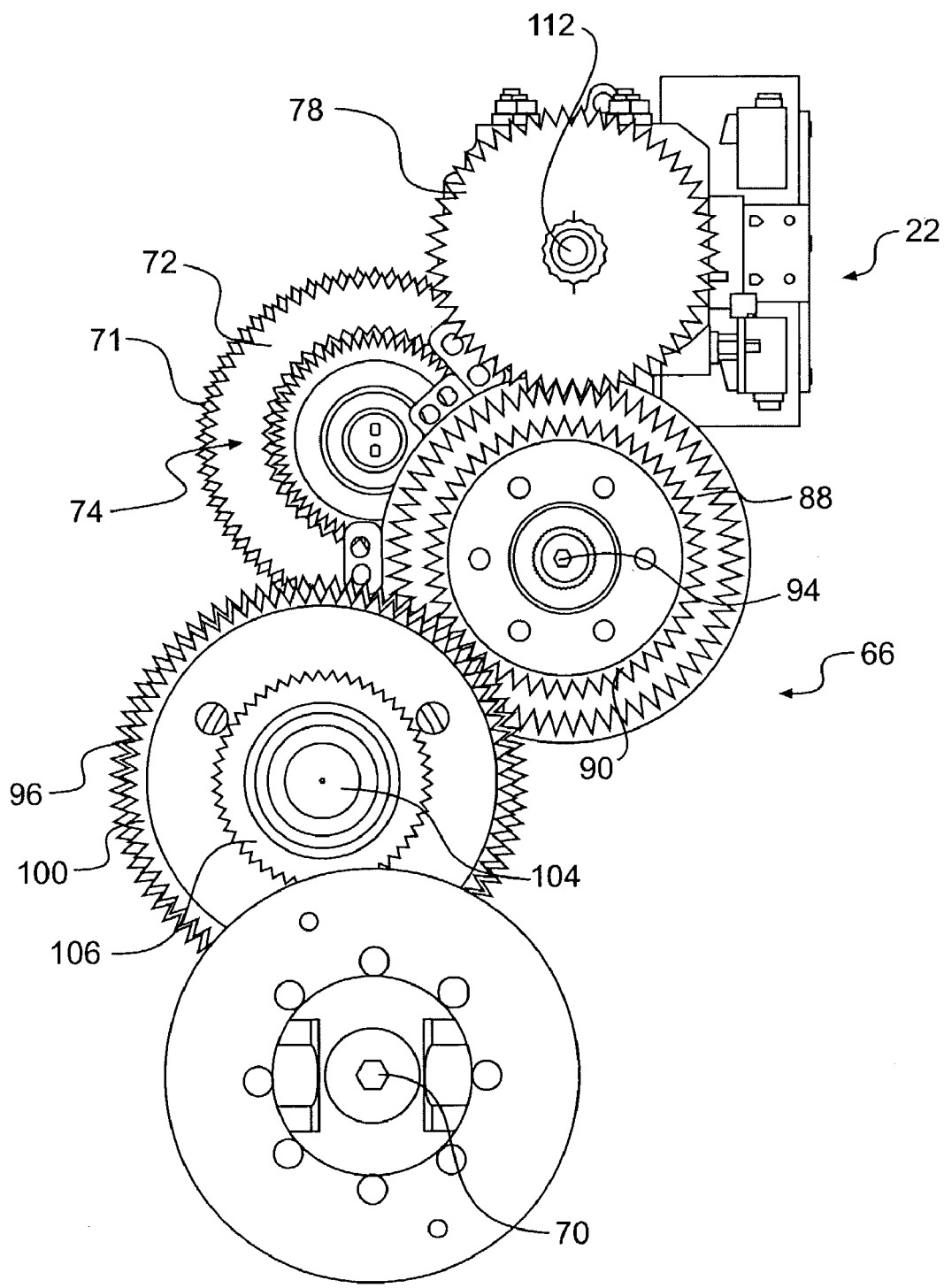
FIG. 6 is a right side view of FIG. 1 with the transmission housing removed.

As shown in FIG. 5, the drive unit 22 may be a hydraulic system, such as, a hydrostatic pump and motor assembly having a hydrostatic pump portion 42 and a motor portion 44. In one exemplary embodiment, the hydrostatic pump and motor assembly is a modified 125 cc Rexroth pump and motor package available from Rexroth. However, other suitable pump and motor assemblies will work and all such variations come within the scope of the present invention.

The hydrostatic pump and motor assembly may also include a head plate extension 46. With reference to FIG. 3, the head plate extension 46 has a left face 48 which may include a fluid port 50 and a threaded bore 52. The head plate extension 46 may be located substantially in the middle of the hydrostatic pump and motor assembly. The head plate extension 46 may assist in locating the hydrostatic pump and motor assembly within the transmission housing 14 as described below. The fluid port 50 supplies fluid, such as oil, to the hydrostatic pump and motor assembly. Although the drive unit 22 has been described as a hydraulic system, one of ordinary skill in the art will recognize that an electric drive assembly, such as, an electric motor may be used. In that particular configuration, the fluid port and head plate extension could be eliminated.

As seen in FIG. 1, the transmission housing 14 includes a first portion 54, also called a cover, and a second portion 56, also called a casing. The first portion 54 and the second portion 56 may be made out any suitable material, such as, for example, gray cast iron. The second axial end 26 of the drive unit 22 may be located within the second portion 56 of the transmission housing. The transmission housing 14 may include a head plate face 58, as seen in FIG. 4, having a fluid port 60 to supply fluid to the hydrostatic pump and motor assembly form of the drive unit 22. A through hole 62 is provided for securing the head plate extension 46 to the head plate face 58. This allows the fluid port 50 of the head plate extension 46 to be aligned with the fluid port 60 of the head plate face 58. The head plate extension 46 may be secured to the head plate face 58 using any suitable fastener 64, such as a bolt or screw. Once the head plate extension 46 is secured to the head plate face 58, the drive unit 22 is located in the housing 14 such that substantially no axial displacement can occur. References to the drive unit being axially movable may refer to stages of the transmission before final assembly wherein the head plate extension 46 is utilized, or after final assembly wherein a head plate extension is not utilized. One of ordinary skill in the art will appreciate that an electric drive assembly would not require the head plate extension, and therefore the electric drive assembly could be moveable in the transmission housing 14.

In the exemplary embodiment shown in FIG. 4, the drive unit 22 is a hydrostatic pump and motor assembly and the fluid flows from the head plate face 58 to the fluid port 60 of the head plate extension 46. The first portion 54 may include the first face 16 and the head plate face 58. As seen in FIG. 1, the left face 48 of the head plate extension 46 may be located adjacent the connection between the first portion 54 and the second portion 56.

As mentioned above, the drive unit 22 is mounted in a transmission 12. In this exemplary embodiment (best seen in FIGS. 1, 2, 5, and 6), the transmission 12 is commonly referred to as a hybrid transmission or a split torque transmission because the transmission 12 has a drive unit 22 and a mechanical transmission component 66. In other words, torque is split between the drive unit 22 and the mechanical component 66. Both the drive unit 22 and the mechanical transmission component 66 may be located inside the transmission housing 14, as in the exemplary embodiment shown. An input shaft 68, which may be coupled to an output shaft of an engine (not shown), may pass through the transmission housing 14. The input shaft 68 may be coupled to the drive unit 22 and the mechanical transmission component 66. An output shaft 70 may be coupled to the mechanical transmission component 66 and passes through the transmission housing 14. In the exemplary embodiment, the axial centerline of the input shaft 68 and the output shaft 70 may be substantially parallel and radially offset from each other.

In an exemplary embodiment (best seen in FIG. 5), the input shaft 68 may include an auxiliary drive gear 71, a first input gear 72, and a reverse clutch arrangement 74 connected thereto. The auxiliary drive gear 71 can be coupled to an auxiliary driven gear 73, which may be used to activate some tool or other device (not shown). The first input gear 72 is coupled to a pump input gear 76, or second input gear, connected to the drive unit 22. The input shaft 68 and input gear 72 may provide input to activate the drive unit. Alternatively, in an embodiment where the drive unit 22 is an electric drive system, the first input gear 72 and pump input gear 76 may be replaced with any suitable power source to activate the drive unit 22. A motor output gear 78, or first output gear, is connected to the drive unit 22. The reverse clutch arrangement 74 may engage a forward clutch arrangement 80 located below the reverse clutch arrangement 74. The forward clutch arrangement 80 is mounted on a support shaft 82. Both the forward clutch arrangement 80 and reverse clutch arrangement 74 may drive the planetary system 84. The forward clutch arrangement 80 and the reverse clutch arrangement 74 may be 135 mm clutches, although other appropriately sized clutches will also work.

The planetary system 84 includes a pinion 85, shown in FIGS. 2 and 5, that engages both the forward clutch arrangement 80 and the reverse clutch arrangement 74. The planetary system 84 also includes a planetary clutch 86, a thin gear 88 coupled to the motor gear 78, a variable clutch gear 90 connected to a variable clutch arrangement 92, or a clutch system, and a support shaft 94. The planetary clutch 86 may be a 280 mm clutch, although other appropriately sized clutches will also work.

The variable clutch arrangement 92 includes a wide gear 96 associated with a low clutch 98, a thin gear 100 associated with a high clutch 102, and a support shaft 104. The wide gear 96 is coupled to a gear 97 and the thin gear 100 is coupled to the variable clutch gear 90. A drive gear 106 may be connected to the variable clutch arrangement 92 and may be coupled to a driven gear 108 on the output shaft 70. The manner in which the transmission 12 operates will be described below.

In the exemplary embodiment, the pump input gear 76 is connected to the first axial end 24 of the drive unit 22 by a pump input shaft 110, or drive shaft, that forms a part of the drive unit 22. The pump input shaft 110 defines an axis of rotation that is substantially parallel to the axial centerline of the input shaft 68. The motor output gear 78 is connected to the second axial end 26 of the drive unit 22 by a motor output shaft 112 that forms a part of the drive unit 22. The motor output shaft 112 also has an axis of rotation that is substantially parallel to the axial centerline axis of the output shaft 70. The motor output gear 78 is coupled to the mechanical transmission component 66, for example, the motor output gear 78 may be coupled to the thin gear 88.

In the exemplary embodiment, all the gears may be spur gears having 4, 4.5, or 5 Module. However, gears with different Modules can be selected based on the size of the transmission.

Figure 7:
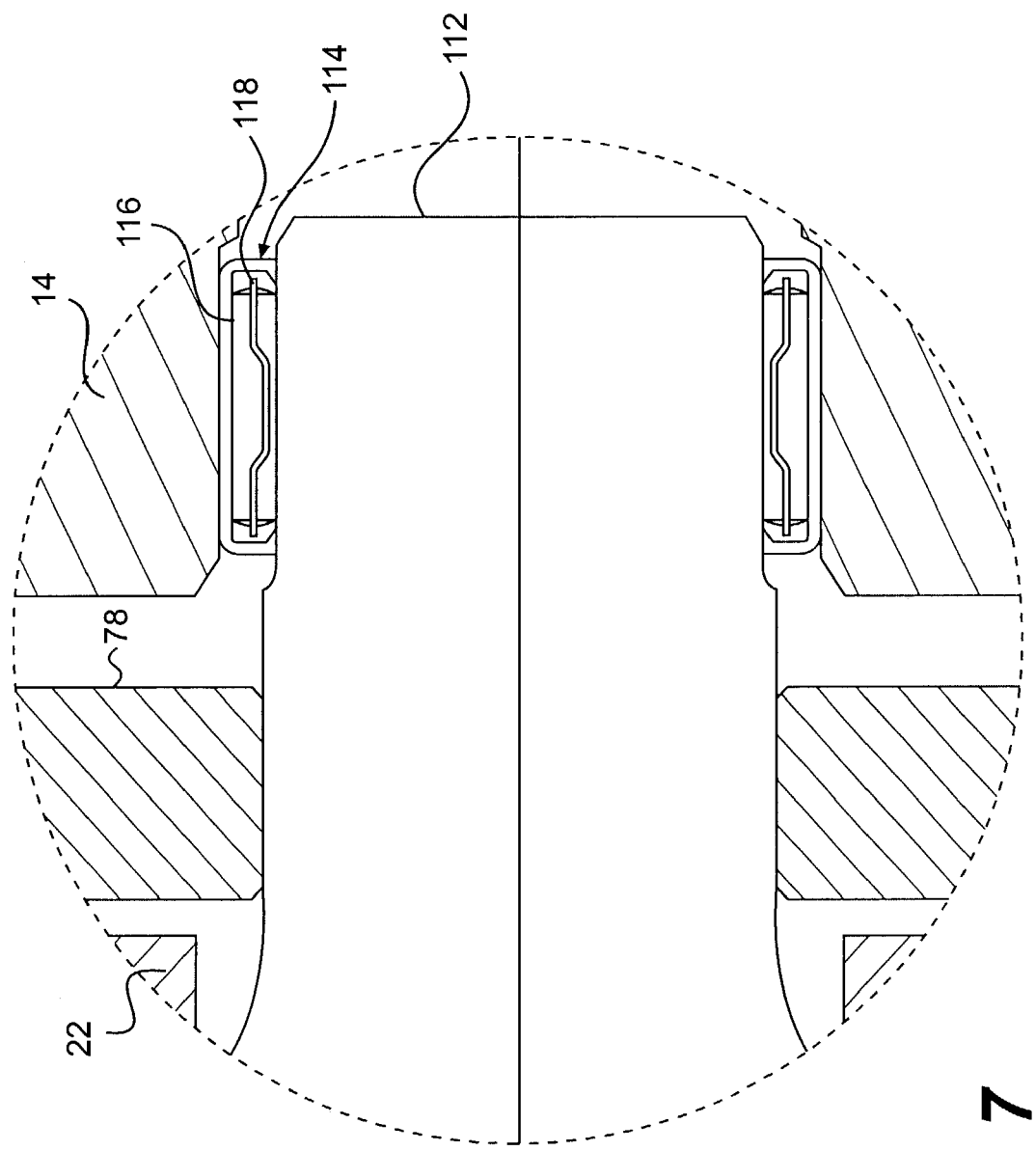
FIG. 7 is a partial section view of FIG. 1 showing a support for the drive unit.

With reference to FIG. 7, the second axial end 26 of the drive unit 22 may be supported by a bearing assembly 114 in the transmission housing 14. The bearing assembly 114 includes a plurality of roller bearings 116, such as needle roller bearings. Each of the roller bearings 116 includes internal support structure 118 to maintain proper orientation of the roller bearings 116 in the bearing assembly. The motor output shaft 112 of the drive unit 22 is supported in the bearing assembly 114 and is free to rotate about its axis of rotation. Through the use of the flange portions 28 and 30 and the bearing assembly 114, the drive unit 22 may be axially moveable during assembly until the first portion 54 and second portion 56 are connected and the head plate extension 46 locates the drive unit 22 within the transmission housing 14.

It is understood that other bearing assemblies, such as other roller bearings or journal bearings, may be used in place of bearing assembly 114. In addition, it is understood that a second bearing assembly may be provided in place of the flange portions 28 and 30 to support the drive unit 22. In this arrangement, the head plate extension 46 or some other means would bear the torque loads experienced by the drive unit 22.

INDUSTRIAL APPLICABILITY

In an exemplary embodiment, the transmission 12 can operate through three ranges in both forward and reverse modes. Each range will be described with respect to the forward direction.

In the first range, the transmission 12 primarily uses the drive unit 22 to drive the output shaft 70. As the input shaft 68 rotates, the first input gear 72 causes the pump input gear to rotate. In an exemplary embodiment employing the hydraulic drive unit the pump portion 42 of the hydrostatic pump and motor assembly is consequently urged to rotate internally. As hydrostatic pump displacement increases, the motor portion 44 also begins to rotate causing the motor output gear 78 to turn. The motor output gear 78 causes the thin gear 88 of the planetary system 84 to rotate. At this point, the planetary clutch 86 is held still and the wide gear 96 rotates along with the low clutch 98 because the wide gear 96 is coupled to gear 97. This rotation is transmitted to the drive gear 106, which is coupled to the driven gear 108 on the output shaft 70. This, in turn, causes the output shaft 70 to rotate. While all this is occurring, the pinion 85 of the planetary system 84 is rotating up to a predetermined speed. Once this predetermined speed is reached, the transmission 12 is ready to enter the second range.

In an alternative embodiment employing an electric drive unit, rotation of the input shaft 68 is not required to cause driving torque of the drive unit 22. Rather, electricity may be applied to the electric drive unit as is customary to cause rotational output of gear 78.

Referring again to the exemplary embodiment employing the hydraulic drive form of the drive unit 22, in the second range, the planetary clutch 86 is released and the forward clutch 80 arrangement is engaged. Next, the speed of the motor portion 44 is reduced until it reaches zero speed and then rotates in the opposite direction. In conjunction with the planetary system 84, the wide gear 96 continues to rotate faster because it is being driven by both the drive unit 22 and the forward clutch arrangement 80. The increased rotation is transmitted to the drive gear 106 and ultimately the output shaft 70. Initially the variable clutch gear 90 and thin gear 100 associated with the high clutch 102 are rotating faster than the support shaft 104. Near the end of the second range the speed of the thin gear 100 is reduced using the planetary system 84 until it substantially matches rotation of the support shaft 104. At this point the transmission 12 is ready to enter the third range.

In the third range, the low clutch 98 is disengaged and the high clutch 102 is engaged. The speed of the motor portion 44 may then be brought back from negative to positive. As a result, the output shaft rotation speed continues to increase to a maximum rotation. To decrease the output shaft rotation speed, the transmission 12 can be taken back down through the three ranges. These three ranges will also apply to reverse, with the primary difference being that the reverse clutch 74 arrangement is engaged, as opposed to the forward clutch arrangement 80.

The rotational speeds created by the transmission 12 going through the three ranges may create high torque loadings on some parts of the transmission 12 including the drive unit 22. By using the flange portions 28 and 30 to secure the drive unit 22 to the transmission housing 14, the rotation of the drive unit 22 due to torque loadings may be limited. In addition, the support members can allow for minor positional adjustments as necessary during assembly.

There are several different approaches to mounting the drive unit 22 within the transmission 12. In addition there are several different approaches for assembling the transmission 12. An exemplary approach for each will be described in turn.

One exemplary method of mounting the drive unit 22 includes providing the transmission housing 12, which includes the first face 16 on the first portion 54 defining the two guide holes 18 and 20. Next, the drive unit 22 may be arranged in the transmission housing 14. Finally, the drive unit 22 may be connected to the transmission housing 14 using support members 36 and 38 passing through the guide holes 18 and 20 of the transmission housing 14 to the guide holes 32 and 34 of the flange portions 28 and 30 of the drive unit 22. This may be accomplished by first pressing the support members 36 and 38 into the guide holes 18 and 20 of the transmission housing 14. Next, the guide holes 32 and 34 of the flange portions 28 and 30 are aligned with the support members 36 and 38. Finally, the flange portions 32 and 34 are slid onto the support members 36 and 38. Alternatively, the guide holes 32 and 34 of the flange portions 28 and 30 may first be aligned with the guide holes 18 and 20 of the transmission housing 14. Then the support members 36 and 38 may be passed through the guide holes 32 and 34 of the flange portions 28 and 30 into the guide holes 18 and 20 of the transmission housing 14.

In this exemplary embodiment, wherein the hydraulic drive unit is the contemplated drive unit 22, the fluid port 60 of the head plate face 58 on the first portion 54 may be coupled to the head plate extension 46. In the instance where the transmission housing includes the first portion 54 and the second portion 56, the head plate extension 46 may be located adjacent the connection between the first portion 54 and the second portion 56. For example, the left face 48 of the head plate extension 46 may be adjacent the connection between the first portion 54 and the second portion 56. This secures the drive unit 22 axially within the transmission housing 14.

Prior to coupling the head plate extension 46 to the head plate face 58, the motor output shaft 112 may be inserted into the bearing assembly 114 supported by the second portion 56 of the transmission housing 14. The first portion 54 and second portion 58 may then be connected.

As mentioned above, there are several ways to assemble the transmission 12. One such approach is to provide a transmission housing 14 having a first face 16 that defines two guide holes 18 and 20. An input shaft 68 is provided which passes through the transmission housing 14 and can be coupled to both the drive unit 22 and the mechanical transmission component 66. An output shaft 70 may be provided and coupled to the mechanical transmission component 66. The output shaft 70 may pass through the transmission housing 14. The drive unit 22 may be located in the transmission housing 14 using the flange portions 28 and 30, the head plate extension 46, and/or the motor output gear 78.

To locate the drive unit 22 using the flange portions 28 and 30, the guide holes 32 and 34 of the flange portions 28 and 30 should be aligned with the guide holes 18 and 20 of the first face 16. The drive unit 22 is then connected to the transmission housing 14 by passing the support members 36 and 38 through the respective guide holes on the first face 16 and the flange portions 28 and 32. For example, the support members 36 and 38 may be press fit into the guide holes 18 and 20 of the first face 16 and then the drive unit 22 can be mounted on the support members 36 and 38. The pump input gear 76 can then be coupled to the first input gear 72. In addition, the motor output gear, which is connected to the second axial end of the drive unit 78, can be coupled to the mechanical transmission component 66, such as the thin gear 88. This may be performed before or after inserting the motor output shaft 112 into the bearing assembly 114. The head plate extension 46 of the drive unit 22 may then be connected to the fluid port 60 on the head plate face 58 of the transmission housing 14. This connection may be used to locate the drive unit 22 longitudinally within the housing by aligning the left face 48 of the head plate extension 46 adjacent the connection between the first portion 54 and second portion 56 of the transmission housing 14. In the embodiment where the drive unit 22 is an electric drive system, it is contemplated that the head plate extension 46 may be eliminated and the drive unit 22 would axially moveable within the housing.

Thus the present invention provides a mounting assembly that can easily and reliably mount a drive unit within a transmission housing without using a SAE standard mounting arrangement. Such an arrangement will also allow for appropriate tolerancing in the location of the drive unit. Furthermore, by eliminating the need to bolt the drive unit 22 to the transmission housing 14, the transmission 12 may be assembled more quickly and efficiently.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A transmission assembly, comprising:
   a housing;
   an input shaft driveably engaged and being rotatably supported in the housing;
   an output shaft rotatably supported in the housing;
   a drive unit disposed within the housing and being operative to rotate the output shaft in response to an input, the drive unit having at least one end slidably connected to the housing; and
   a mechanical transmission component disposed within the housing and being drivingly engaged with the input shaft, the drive unit and the mechanical transmission component being drivingly engaged with the output shaft.

2. The transmission assembly of claim 1, wherein the drive unit includes at least one drive shaft defining an axis of rotation, the axis of rotation of the at least one drive shaft being substantially parallel with an axial centerline of the input shaft.

3. The transmission assembly of claim 1, further including a bearing assembly supported in the transmission housing and wherein the drive unit includes a second end opposite the at least one end and an output shaft extending from the second end and supported by the bearing assembly such that the second end is slidably connected to the transmission housing.

4. The transmission assembly of claim 1, further including at least one support member fixed to the housing, the housing defining a mounting face, the at least one end of the drive unit defining at least one flange portion, the at least one flange portion overlaying the mounting face of the housing portion and including at least one guide hole, the drive unit at least one end of the drive unit being slidably connected to the support member via the guide hole.

5. The transmission assembly of claim 4, wherein the support member is a dowel.

6. The transmission assembly of claim 4, further including a second support member fixed to the housing and a second flange portion defined by the at least one end of the drive unit and having at least one guide hole, the at least one flange portion and second flange portion defining a flange mounting face, the flange mounting face being substantially perpendicular relative to an axial centerline of the input shaft.

7. The transmission assembly of claim 1, wherein the drive unit comprises a hydraulic drive component including an input gear in mesh with an input gear provided on the input shaft.

8. The transmission assembly of claim 7, wherein the input shaft is arranged radially offset relative to the output shaft and the hydraulic drive system includes at least one drive shaft arranged radially offset relative to the input shaft.

9. The transmission assembly of claim 7, wherein the mechanical transmission component includes an output gear engaged with the output shaft through a clutch system.

10. The transmission assembly of claim 7, wherein the mechanical transmission component includes an output gear engaged with the output shaft through a planetary system.

11. The transmission assembly of claim 1, further including a generally centrally located flange configured to fixedly secure a central portion of the drive unit to the housing.

12. The transmission assembly of claim 11, wherein the generally centrally located flange includes a fluid port.

13. A transmission, comprising:
   a transmission housing having a first face defining at least two guide holes;
   a drive unit located inside the transmission housing;
   a mechanical transmission component located inside the transmission housing;
   an input operative to activate the drive unit, the drive unit being engaged with the mechanical transmission component;
   an input shaft passing through the transmission housing, wherein the input shaft is coupled to the mechanical transmission component;
   an output shaft coupled to the mechanical transmission component and passing through the transmission housing;
   the drive unit having a first axial end with at least two flange portions and a second axial end, each flange portion including a guide hole configured to align with one of the at least two guide holes of the transmission housing; and
   a support member connecting each of the flange portions with one of the guide holes in the first face of the transmission housing.

14. A transmission according to claim 13, wherein a first output gear is connected to the second axial end of the drive unit and is coupled to the mechanical transmission component.

15. A transmission according to claim 13, wherein the input comprises an electrical power source and the drive unit comprises an electrical drive component.

16. The transmission assembly of claim 13, further including a bearing assembly supported by the transmission housing and wherein the drive unit includes an output shaft supported in the bearing assembly.

17. A transmission according to claim 13, wherein the at least two guide holes in the first face provide an interference fit for the support members and each guide hole of the drive unit provides a slip fit for the support members to allow for axial adjustment of the drive unit.

18. A transmission according to claim 13, wherein the at least two flange portions are arranged substantially opposite each other and limit rotation of the drive unit due to torque loading.

19. A transmission according to claim 13, wherein the input includes the input shaft and the drive unit comprises a hydraulic drive component, the input shaft includes a first input gear coupled to a second input gear, the second input gear being connected to the first axial end of the hydraulic drive component.

20. A transmission according to claim 19, wherein the transmission housing includes a head plate face having a fluid port to supply fluid to the hydraulic drive component, and the hydraulic drive component includes an head plate extension connected to the fluid port.

21. A transmission according to claim 20, wherein the transmission housing includes a first portion and a second portion, the first portion having the first face and the head plate extension being adjacent a connection between the first portion and the second portion of the transmission housing.

22. A method of assembling a transmission assembly, comprising:
providing a housing;
supporting an input shaft in the housing;
supporting an output shaft in the housing;
mounting a drive unit within the housing component, wherein at least one end of the drive unit is slidably connected to the housing;
locating a mechanical transmission component within the housing and connecting the input shaft to the mechanical transmission component; and
connecting the output shaft to the drive unit through the mechanical transmission component.

23. The method according to claim 22, wherein a bearing assembly is supported in the transmission housing and the drive unit includes an output shaft, the method further includes supporting the output shaft of the drive unit in the bearing assembly such that a second end of the drive unit opposite the at least one end is slidably connected to the transmission housing.

24. The method of claim 22, further including fixedly securing a generally central portion of the drive unit to the housing.

25. The method according to claim 22, wherein the housing defines a mounting face, the at least one end of the drive unit defining at least one flange portion including a guide hole, and the method includes:
fixing a support member to the housing;
overlaying the at least one flange portion on the mounting face of the housing so the at least one end of the drive unit is slidably connected to the support member via the guide hole.

26. The method according to 25, wherein the at least one end of the drive unit defines a second flange portion having a guidehole therethrough, the at least one flange portion and second flange portion defining a flange mounting face, and the method includes:
fixing a second support member to the housing; and
overlaying the flange mounting face of the drive unit on the mounting face of the housing so the at least one end of the drive unit is slidably connected to both support members and is substantially perpendicular relative to an axial centerline of the input shaft.

27. The method according to claim 22, wherein the drive unit comprises a hydraulic drive component, and the method further includes meshing an input gear of the hydraulic drive component with an input gear provided on the input shaft.

28. The method according to claim 27, further including meshing an output gear of the mechanical transmission component with the output shaft through a planetary system.

29. The method according to claim 27, further including meshing an output gear of the mechanical transmission component with the output shaft through a clutch system.

* * * * *

UNITED STATES PATENT AND TRADEMARK OFFICE
CERTIFICATE OF CORRECTION

PATENT NO. : 6,880,429 B1  
APPLICATION NO. : 10/422984  
DATED : April 19, 2005  
INVENTOR(S) : Steven A. Daniel et al.

It is certified that error appears in the above-identified patent and that said Letters Patent is hereby corrected as shown below:

Title Page, insert Item (73) Assignee:

(73) Assignee: --Caterpillar Inc., Peoria, IL (US)--

Signed and Sealed this

Third Day of February, 2009

JOHN DOLL  
*Acting Director of the United States Patent and Trademark Office*